US007243222B2

(12) United States Patent
Rothman et al.

(10) Patent No.: US 7,243,222 B2
(45) Date of Patent: Jul. 10, 2007

(54) STORING DATA RELATED TO SYSTEM INITIALIZATION IN MEMORY WHILE DETERMINING AND STORING DATA IF AN EXCEPTION HAS TAKEN PLACE DURING INITIALIZATION

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 10/877,218

(22) Filed: Jun. 24, 2004

(65) Prior Publication Data
US 2005/0289333 A1 Dec. 29, 2005

(51) Int. Cl.
*G06F 9/00* (2006.01)
(52) U.S. Cl. .......................................................... 713/1
(58) Field of Classification Search .................... 713/1, 713/2; 714/23, 723; 370/241
See application file for complete search history.

(56) References Cited

U.S. PATENT DOCUMENTS 5,974,546 A * 10/1999 Anderson ..................... 713/2
6,185,678 B1 * 2/2001 Arbaugh et al. ............... 713/2
6,463,531 B1 * 10/2002 Aguilar et al. ................ 713/2
6,625,728 B1 * 9/2003 Ahrens et al. ................. 713/2
2003/0070115 A1 * 4/2003 Nguyen et al. .............. 714/23
2003/0212936 A1 * 11/2003 Neuman et al. ............ 714/723
2005/0190699 A1 * 9/2005 Smith et al. ................ 370/241

OTHER PUBLICATIONS

U.S. Appl. No. 10/746,576, filed Dec. 24, 2003, entitled, "A System And Method To Export Pre-Boot System Access Data To Be Used During Operating System Runtime".
U.S. Appl. No. 10/622,110, filed Sep. 12, 2003, entitled, "System And Method For Firmware To Export Pre-Boot Data Into The Operating System Runtime Environment".

* cited by examiner

*Primary Examiner*—Chun Cao
*Assistant Examiner*—Sean Weinman
(74) *Attorney, Agent, or Firm*—Cyndi M. Wheeler

(57) ABSTRACT

A method of storing data related to system initialization in a data hub in a manner which provides accessibility to the data in either the pre-boot environment or the run-time environment.

29 Claims, 3 Drawing Sheets

STORING DATA RELATED TO SYSTEM INITIALIZATION IN MEMORY WHILE DETERMINING AND STORING DATA IF AN EXCEPTION HAS TAKEN PLACE DURING INITIALIZATION

FIELD

The present invention relates to the field of computer systems, and more particularly to system error analysis and system debugging.

BACKGROUND

When initializing or booting a computer platform, there are two primary stages of system evolution. First, in the pre-boot environment, the system performs tasks such as preparing the hardware, discovering and/or checking the memory, initializing the chipset, and so on. These tasks may be performed by BIOS or firmware in order to prepare the system to boot a target. Typically, the target to be booted is an operating system (O/S). After the target is booted, the system is in a run-time environment controlled by the O/S.

In the case of a catastrophic failure, there is relatively little visibility into the cause of an error within the pre-boot environment. Within the pre-boot environment itself, errors may be detected using a Power-On Self Test (POST) card, or other debug techniques. However, debug techniques such as POST do not typically provide a comprehensive log of pre-boot data; they simply provide information about the point at which a critical error has occurred.

There is also no mechanism by which the operating system may be notified of other non-critical issues that are encountered during pre-boot. The operating system and programs which are running on the O/S must rely upon the integrity of the underlying operating system and platform in order to function correctly. The existence of a non-critical error in the pre-boot environment may lead to a critical error or failure in the run-time environment. The O/S has no visibility of certain hardware issues that occurred during the pre-boot which the firmware would be aware of. Some examples of hardware problems that may occur in the pre-boot environment which the O/S may not be aware of, and that a user may not be able to find in a dump file, include the existence of a bad microprocessor (CPU), problems with chipset timing, or a bad disk.

DETAILED DESCRIPTION

Embodiments of a method for providing system state information for a computer system are disclosed. The computer system may be any system which includes at least a processor (CPU) and memory, including, but not limited to, a personal computer (PC), a mobile computer, a server, or a handheld device. These systems may include various types of software, firmware, and hardware.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
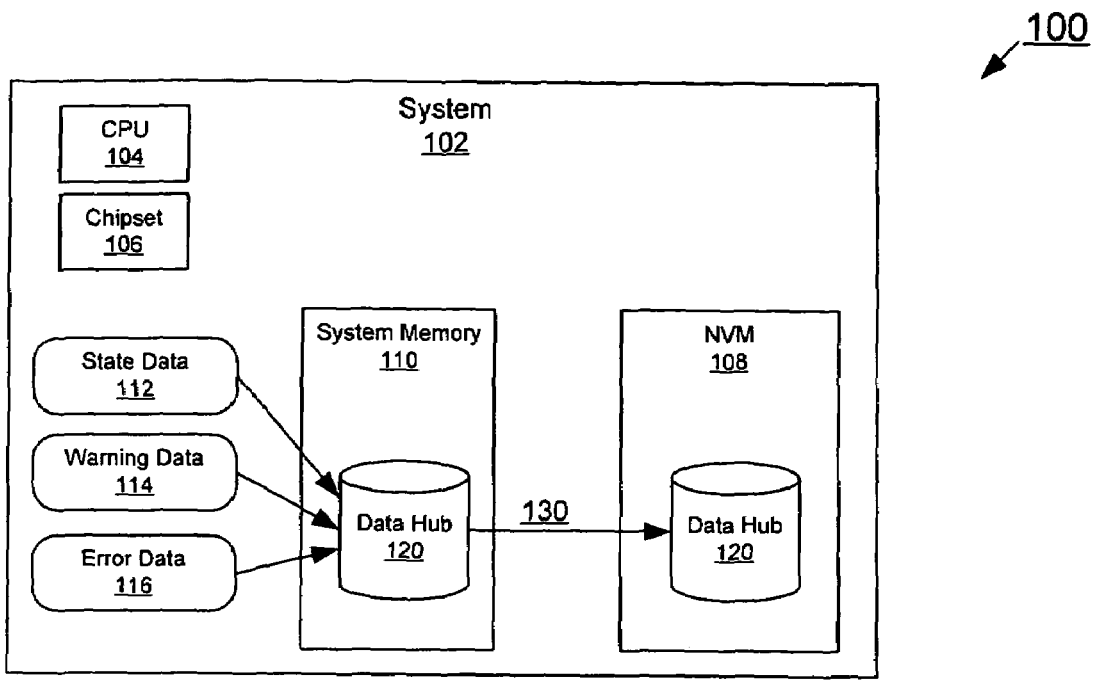
FIG. 1 is an illustration of a system in the pre-boot environment according to an embodiment of the present invention.

FIG. 1 illustrates a computer system 102 in the pre-boot environment 100 according to an embodiment of the present invention. Computer system 102 may include a CPU 104, a chipset 106, non-volatile memory 108, such as a hard disk or flash memory, and system memory 110, such as SDRAM or another type of volatile memory. Computer system 102 may also include other components, including but not limited to items such as a network interface, a video interface, and other peripheral devices which are not illustrated.

When the system 102 is powered on, system initialization begins. During system initialization, in the pre-boot environment, system BIOS, firmware, drivers, or other system components may provide data related to the system initialization. This data may include, but is not limited to, state data 112, warning data 114, and error data 116. State data 112 may include information such as driver initialization status, driver version numbers, or other data related to the state of the system that a user may be interested in accessing. Warning data 114 may include information which indicates that something unexpected (but not fatal) has occurred, or may include non-critical information related to potential CPU, chipset, or memory issues. An example of potential warning data may be an indication that the temperature of the CPU is beyond a threshold value, or that there are timing issues with the chipset or memory. Error data 116 may include data related to critical errors which cause system initialization to fail.

State data 112, warning data 114, and error data 116 may be written to a centralized data hub 120 in the pre-boot environment. By using a data hub which has all state, warning, and error messages posted to it, one may initiate a dump of core data to the hard disk or other non-volatile memory. This may allow the core data to be accessed at some time after the system failure for analysis of the issue which may have caused the failure. In one embodiment, a user may choose what data is written to the data hub 120, and may choose, for example, to store only certain types of data, such as warning or error data, and may choose not to store state data.

In the pre-boot environment, the data hub 120 may reside initially in system memory 110. The contents of the data hub may be written 130 to non-volatile memory 108 upon the occurrence of a specific event, such as when an exception occurs, or upon transition to the O/S runtime environment. Updating the data hub contents in non-volatile memory 108 frequently may cause system performance during initialization to decrease. However, more frequent updates of the data hub contents in non-volatile memory, such as an update each time state data is generated by the system, may be useful if the system fails to boot the target. In this case, all data generated during system initialization up until the time of system failure would be stored in non-volatile memory and may be accessible for post-failure analysis.

The system may also include various components capable of executing instructions to accomplish an embodiment of the present invention. For example, the system may include and/or be coupled to at least one machine-accessible medium. As used in this specification, a "machine" includes, but is not limited to, any data processing device with one or more processors. A machine-accessible medium includes any mechanism that stores and/or transmits information in any form accessible by a data processing device, including but not limited to recordable/non-recordable media (such as read only memory (ROM), random access memory (RAM), magnetic disk storage media, optical storage media, and flash memory devices), as well as electrical, optical, acoustical, or other form of propagated signals (such as carrier waves, infrared signals, and digital signals).

According to an embodiment, the system may include various other well known components. The processor and machine-accessible media may be communicatively coupled using a bridge/memory controller, and the processor may be capable of executing instructions stored in the machine accessible media. The bridge/memory controller may be coupled to a graphics controller, and the graphics controller may control the output of display data on a display device. Similarly, an audio adapter may be coupled to the bridge/memory controller to control the output of audio to a speaker. The bridge/memory controller may be coupled to one or more buses. A host bus controller, such as a Universal Serial Bus (USB) host controller may be coupled to the bus(es) and a plurality of devices may be coupled to the USB. For example, user input devices such as a keyboard and mouse may be included in the data processing device for providing input data. The data processing device may additionally include a network interface (e.g., a network interface card and/or a modem) capable of coupling the device to a network.

Figure 2:
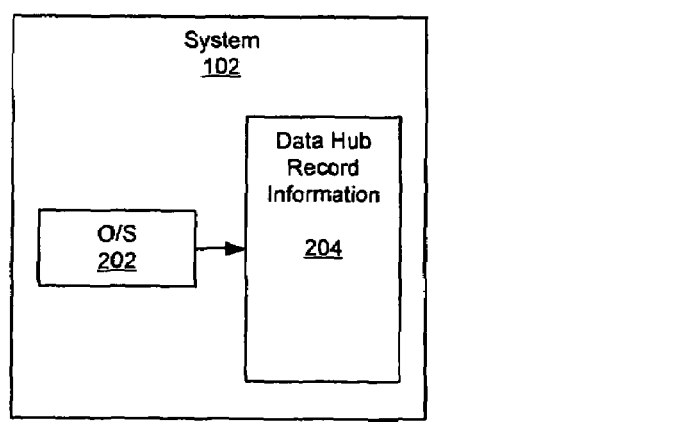
FIG. 2 is an illustration of a system in the runtime environment according to an embodiment of the present invention.

FIG. 2 illustrates conceptually the computer system 102 of FIG. 1 in the run-time environment 200 according to an embodiment of the present invention. In the run-time environment, an operating system (O/S) 202 or other target may be running on the system 102. Upon transition to the run-time environment, the data hub contents 120 (FIG. 1) from the pre-boot environment 100 (FIG. 1) may be exported to data hub record information 204 (FIG. 2), which may enable the O/S 202 to readily access the information in the run-time environment. In embodiments of the present invention, the data hub record information 204 may exist as either an ACPI SSDT record or to an EFI (Extensible Firmware Interface) configuration table in the run-time environment. EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device.

The O/S may access the ACPI SSDT records or the EFI configuration table to determine what system state, warning, and/or error data may have been collected in the pre-boot environment. Furthermore, the O/S may utilize this data to analyze any errors or dumps which may occur in the run-time environment. This may effectively provide the O/S with visibility into certain issues that may have occurred in the pre-boot environment, and furthermore may facilitate the ability to use data from the pre-boot environment to debug issues which may occur in the run-time environment.

Figure 3:
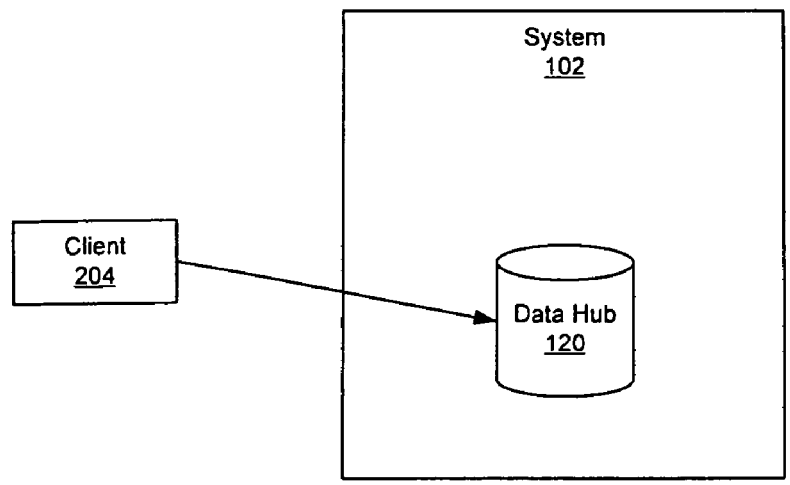
FIG. 3 is an illustration of a system according to an embodiment of the present invention.

FIG. 3 illustrates an embodiment of the present invention wherein a client 204 external to system 102 may be able to access the contents of the data hub 120. This may aid in debugging a system or system components when the system either fails to boot the target, or where the system successfully boots the target but a component of the system fails or does not operate properly and no run-time data related to the component exists.

Figure 4:
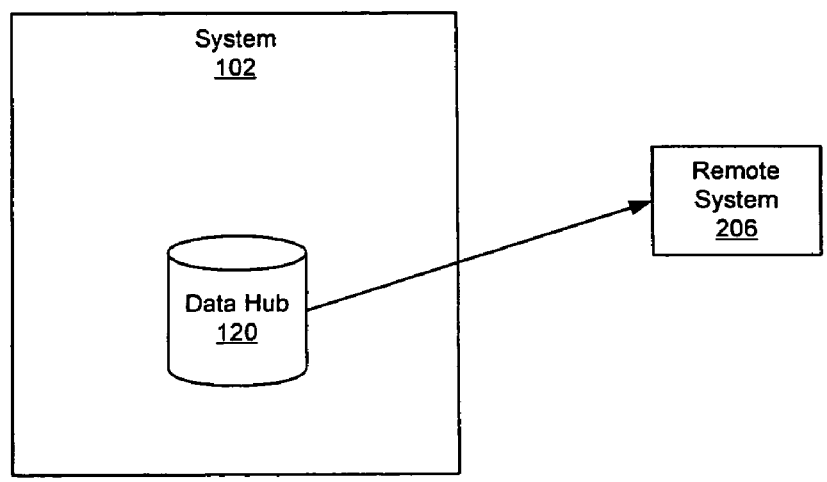
FIG. 4 is an illustration of a system according to an embodiment of the present invention.

FIG. 4 illustrates an embodiment of the present invention wherein the system 102 may send the contents of the data hub 120 to an external remote system or service technician 206. This may aid in system debug in instances where the system must be serviced remotely. In one embodiment, a user may press a key on the keyboard or perform another action during system initialization to send the contents of the data hub 120 to a remote system 206.

Figure 5:
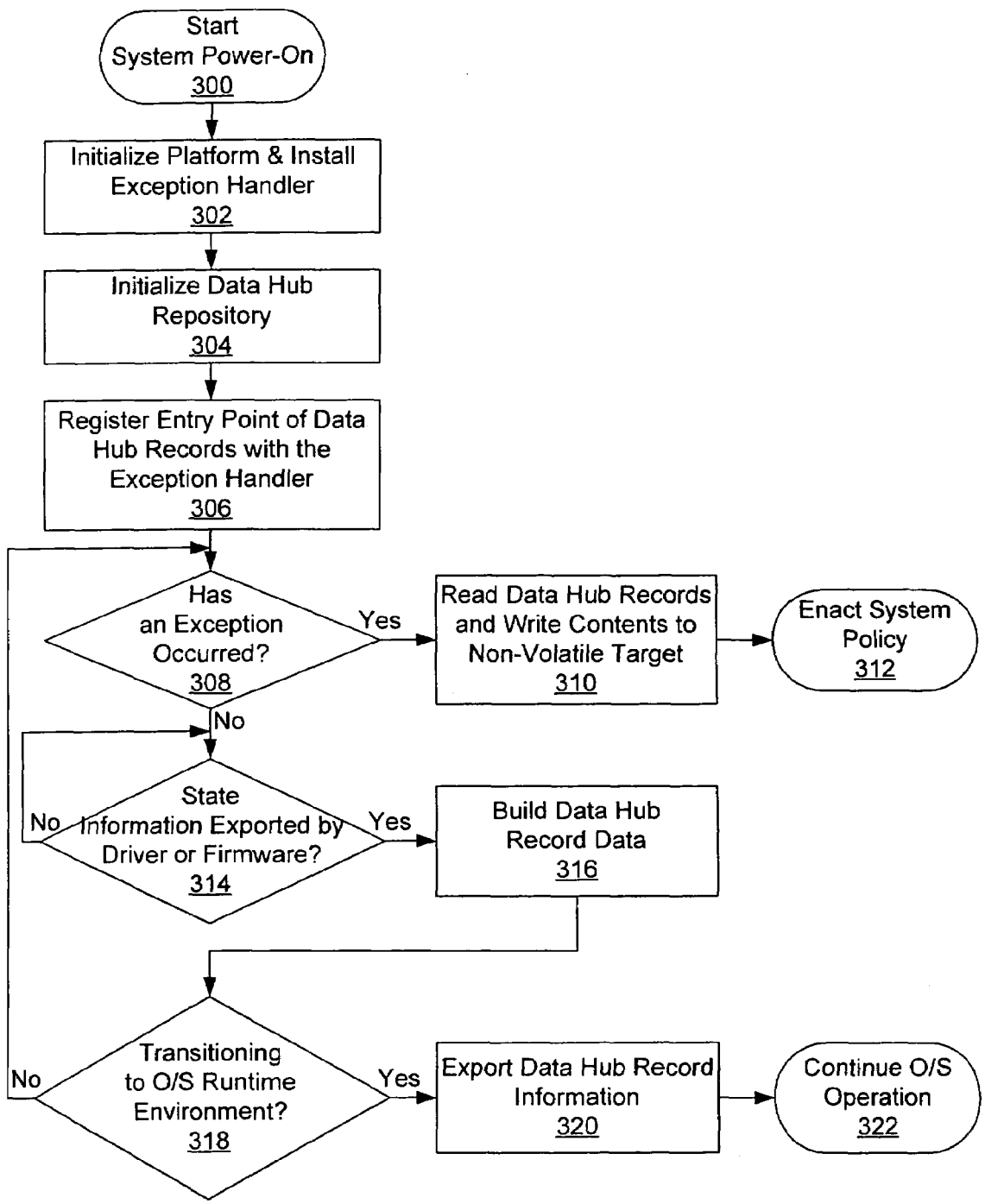
FIG. 5 is a flowchart illustrating an embodiment of the present invention.

FIG. 5 is a flowchart illustrating an embodiment of the present invention. Although the following operations may be described as a sequential process, many of the operations may be performed in parallel or concurrently. In addition, the order of the operations may be re-arranged without departing from the spirit of embodiments of the invention. In block 300, the system is powered on. This begins the system initialization process. Next, in block 302, the platform may be initialized and an exception handler may be installed. Next, in block 304, the data hub repository may be initialized. The data hub repository may be an entity in system memory, and may be used to store system data, including, but not limited to state data, warning data, and error data. In block 306, the entry point of the data hub repository is registered with the exception handler. Thus, if an exception is generated, the exception handler may know where to begin logging state/warning/error data in memory.

If an exception is generated, block 308, then all data hub records are read, and the contents of the data hub are written to a non-volatile target, as shown by block 310. In one embodiment, the non-volatile target may be a hard disk drive. In another embodiment, the non-volatile target may be flash memory. After the contents of the data hub are written to a non-volatile target, the system policy may be enacted, block 312. In one embodiment, the platform may send an alert broadcast over a network so that a remote server may retrieve the error log from the non-volatile target to see what happened. In another embodiment, firmware may launch an error viewer to view the contents of the data hub.

In one embodiment, the contents of the data hub may be written to a non-volatile target upon the occurrence of events other than exceptions. The contents of the data hub may be written to a non-volatile target each time state information is generated. While this implementation may decrease system performance, it may also ensure that all pre-boot data is logged to non-volatile memory and that none is lost due to system failure.

If no exception is generated, in block 314 the system may check to see if any state information has been exported by a driver or by firmware. If no state information has been exported, the system may continue to polling to determine if/when state information is exported. When state information is exported, data hub record data may be built, as illustrated in block 316. The state information is placed in the data hub repository. After each data hub record is created, at block 316, the system determines whether a transition to the runtime environment is occurring. If there is no transition to the runtime environment, the system continues polling to determine if any exceptions have occurred (block 308) or if any state information has been exported (block 314).

Upon transition to the runtime environment, the data hub record information is exported (block 320). The data hub record information may be exported to either an ACPI SSDT record or to an EFI configuration table. The O/S may access the ACPI SSDT records or the EFI configuration table to determine what system state, warning, and/or error data may have been collected in the pre-boot environment.

Thus, methods to provide system state information in a platform-agnostic manner have been disclosed. These methods may be implemented in software or firmware, among other implementations. In the above description, numerous specific details are set forth. However, it is understood that embodiments may be practiced without these specific details. In other instances, well-known circuits, structures and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method comprising:
performing a system initialization of a system;
storing data related to the system initialization in a data hub in a system memory;
determining if an exception has taken place during the system initialization, and if so, reading data hub data from the data hub and writing the data hub data to a non-volatile target; and
exporting the data hub data from the data hub to an operating system (O/S) accessible location.

2. The method of claim 1, wherein performing a system initialization comprises: in a pre-boot environment, preparing system hardware, discovering the system memory and initializing a chipset.

3. The method of claim 1, wherein the data related to the system initialization comprises state data, warning data, and error data.

4. The method of claim 1, further comprising launching an error viewer to view the data hub data.

5. The method of claim 1, further comprising sending an alert broadcast over a network to indicate that an error has occurred.

6. The method of claim 1, further comprising sending the data hub data from the non-volatile target to a remote system.

7. The method of claim 1, wherein the non-volatile target comprises a hard disk.

8. The method of claim 1, wherein the non-volatile target comprises flash memory.

9. The method of claim 1, wherein exporting the data from the data hub to the O/S accessible location comprises exporting the data to one of: an ACPI SSDT record and an EFI configuration table.

10. The method of claim 1, wherein exporting the data from the data hub to the O/S accessible location occurs upon a transition to an O/S runtime environment.

11. The method of claim 1, further comprising accessing the exported data from an O/S.

12. The method of claim 11, further comprising using the data to debug the system.

13. An article comprising a machine-accessible medium having stored thereon instructions that, when executed by a machine, cause the machine to log state data by:
performing a system initialization;
storing data related to the system initialization in a data hub in a system memory;
determining if an exception has taken place during the system initialization, and if so, reading data hub data from the data hub and writing the data hub data to a non-volatile target; and
exporting the data hub data from the data hub to an operating system (O/S) accessible location.

14. The article of claim 13, wherein the instructions, when executed by the machine, further cause the machine to export the data from the data hub to the O/S accessible location upon transition to an O/S runtime environment.

15. A system, comprising:
a bus;
a processor coupled to the bus;
a video interface device coupled to the bus; and
memory coupled to the processor, the memory adapted for storing instructions, which upon execution by the processor, cause:
a system initialization to occur;
data related to the system initialization to be stored in a data hub in system memory;
data hub data to be read from the data hub and written to a non-volatile target if an exception occurs during the system initialization; and
the data hub data from the data hub to be exported to an O/S accessible location.

16. The system of claim 15, further comprising instructions to cause the machine to export the data from the data hub to the O/S accessible location upon transition to an O/S runtime environment.

17. The system of claim 16, further comprising instructions to access the exported data from an O/S.

18. A method comprising:
initializing a system and installing an exception handler;
initializing a data hub repository in system memory for data hub records;
registering an entry point of the data hub records in the data hub repository with the exception handler;
determining if an exception has occurred, and if so, reading each data hub record and writing the contents to a non-volatile target;
determining if state information has been exported, and if so, building data hub record data; and
determining if the system is transitioning to an O/S run-time environment, and if so, and exporting the data hub record information.

19. The method of claim 18, wherein the non-volatile target comprises a hard-disk drive.

20. The method of claim 18, wherein the non-volatile target comprises flash memory.

21. The method of claim 18, further comprising enacting a system policy if an exception has occurred.

22. The method of claim 21, wherein enacting a system policy comprises sending the contents of the data hub to a display for viewing.

23. The method of claim 18, further comprising accessing the exported data hub record information from an O/S.

24. An article comprising a machine-accessible medium having stored thereon instructions that, when executed by a machine, cause the machine to log state data by:

initializing a system and installing an exception handler;
initializing a data hub repository in system memory for data hub records;
registering the entry point of the data hub records in the data hub repository with the exception handler;
determining if an exception has occurred, and if so, reading each data hub record and writing the contents to a non-volatile target;
determining if state information has been exported, and if so, building data hub record data;
determining if the system is transitioning to an O/S run-time environment, and if so, and exporting the data hub record information.

25. The article of claim 24, wherein the instructions, when executed by the machine, further cause the machine to enact a system policy if an exception has occurred.

26. The article of claim 24, wherein the instructions, when executed by the machine, further cause the machine to access the exported data hub record information from an O/S.

27. A system, comprising:
a bus;
a processor coupled to the bus;
a video interface device coupled to the bus; and
memory coupled to the processor, the memory adapted for storing instructions, which upon execution by the processor, cause a system to be initialized, an exception handler to be installed, a data hub repository for data hub records to be initialized in system memory, an entry point of the data hub records in the data hub repository to be registered with the exception handler, a determination to be made whether an exception has occurred, and if so, reading data hub data from the data hub repository and writing the data hub data to a non-volatile target; a determination to be made whether state information has been exported, and if so, building data hub record data, and a determination to be made whether the system is transitioning to an O/S run-time environment, and if so, and exporting the data hub record information.

28. The system of claim 27, further comprising instructions to cause the machine to enact a system policy if an exception has occurred.

29. The system of claim 27, further comprising instructions to cause the machine to enact to access the exported data hub record information from an O/S.

* * * * *